R. W. PITTMAN.
SAW AND METHOD AND MEANS OF HARDENING THE SAME.
APPLICATION FILED NOV. 30, 1917.
1,351,440. Patented Aug. 31, 1920.
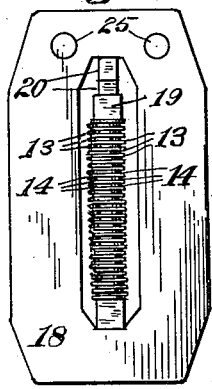
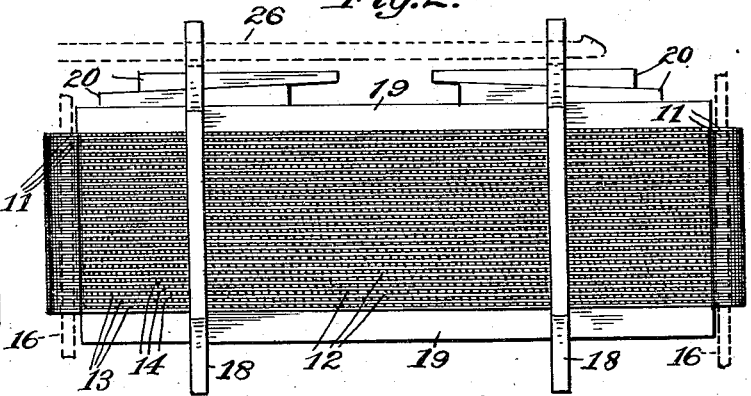
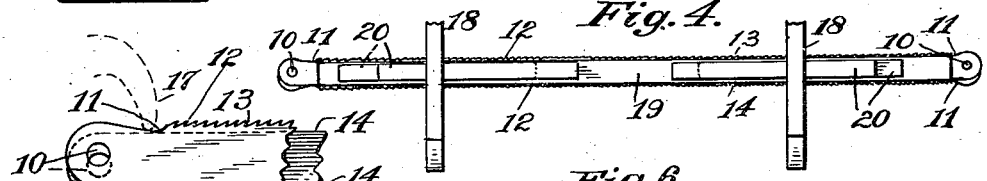
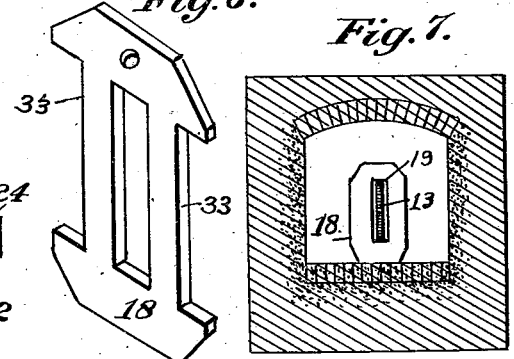
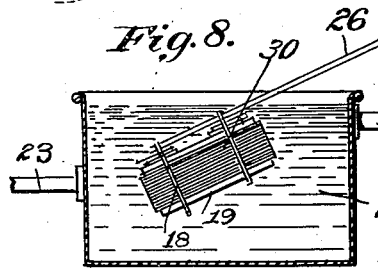
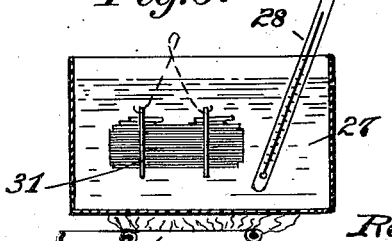
Inventor
Reinhart W. Pittman.
By his Attorney

UNITED STATES PATENT OFFICE.

REINHART W. PITTMAN, OF NEW YORK, N. Y., ASSIGNOR, BY MESNE ASSIGNMENTS, TO HENRY C. PITTMAN, OF HACKENSACK, NEW JERSEY.

SAW AND METHOD AND MEANS OF HARDENING THE SAME.

1,351,440.      Specification of Letters Patent.    Patented Aug. 31, 1920.

Application filed November 30, 1917. Serial No. 204,482.

*To all whom it may concern:*

Be it known that I, REINHART W. PITTMAN, a citizen of the United States, and a resident of the borough of Manhattan, in the city, county, and State of New York, have invented certain new and useful Improvements in Saws and Methods and Means of Hardening the Same, of which the following is a specification.

This invention relates to flexible saw blades, particularly hack saw blades, and it is the object of the invention to provide an improved flexible saw blade and a method and means of hardening or tempering the teeth thereof, as well as an improved method of and means to assemble and support a series of saw blades to temper or harden a plurality of saw blades simultaneously.

In the ordinary method of hardening or tempering hack saw blades a plurality of saw blades are simultaneously treated in a loose and separated condition or state with the result that all parts of the blade or blades are tempered or hardened thereby making the blade rigid and inflexible and should the blade be bent or buckled during the cutting or sawing of a piece of stock the saw will break. It is the object of the invention to harden or temper the toothed zone of a blade only, and to maintain the body portion of the blade in its normal flexible and pliable state. The known methods of only tempering the toothed zone of saw blades are uncertain and unreliable in that, especially in the tempering of saw blades the teeth of which are of very fine pitch, invariably only the face and immediate adjacent portions of the teeth are provided with a face tempering or hardening with the result that when the saw is used this surface tempering chips or quickly wears off and the utility of the same is problematical.

It is the principal object of the present invention to overcome the above disadvantages by providing an improved form of blade and an improved method of and means to assemble and support a plurality of blades whereby the entire surface of the toothed zone of the blades is exposed and adapted to be subjected to the hardening operation and the hardening of the entire toothed zone of the respective blades assured.

In the drawing accompanying and forming a part of this specification Figure 1 is a side elevation of a saw blade made in accordance with an embodiment of my invention.

Fig. 2 is a side elevation of a pile of saw blades showing the method and means to assemble, clamp and support said blades in assembled condition to carry out the method of hardening the toothed zone thereof.

Fig. 3 is a view looking at the end of Fig. 2.

Fig. 4 is a view looking at the top of Fig. 2.

Fig. 5 is an enlarged detail view showing one manner and means to project the toothed edge of alternate blades beyond the back edge of adjacent and interposed blades.

Fig. 6 is a perspective view of a modified form of clamping member to carry a plurality of piles of assembled saw blades.

Fig. 7 is a diagrammatic view of a heating furnace to show the manner of heat treating the assembled blades.

Fig. 8 is a side elevation of a quenching or cooling bath and showing in a diagrammatic manner the method of chilling the heated blades; and Fig. 9 is a side elevation of a bath and showing in a diagrammatic manner the method of drawing the temper of the blades to bring the toothed zone of the blades to the desired degree of hardness.

Similar characters of reference designate like parts throughout the different views of the drawing.

In carrying out the invention the saw blade is stamped from a sheet of metal and provided at opposite ends with the usual perforations 10 for the engagement of means to secure the blade in a saw carrying frame. The blade is also formed with gage portions, shown as recesses 11 stamped from blank portions of the blade adjacent opposite ends and in the edge of the blade upon which the teeth 12 are located, the teeth being formed in a suitable manner and extending between such gage portions with the latter extending to substantially below the base of the teeth so that the toothed zone of the blade extends beyond the bottom of the recesses.

The blades are then assembled side by side or in juxtaposed relation in piles with the toothed edge of successive blades, as shown at 13, alternating with the back edge of successive blades, as shown at 14, so that the toothed edges of alternate blades extend from opposite sides of the pile with the back edge of a blade interposed between adjacent toothed edges. To assemble the blade so that the entire surface of the toothed zone of the successive blades are exposed, the blades may be assembled upon bars, for instance as shown in dotted lines in Fig. 2, so that the bars engage the gage portions or notches 11 of alternate blades with the result that the teeth of such blades will extend downward beyond the back edge of alternate or interposed blades, and the toothed edge of such interposed blades will extend up above the back edge of the alternate blades the notch gages of which are engaged by the bars. Or if desired the blades may be assembled upon any suitable support in the relation above described and then grasped by knife edge tongs 17 at the recessed ends to project the toothed edge of the blades beyond the back edge of adjacent blades, as shown in a general way in Fig. 5.

The blades are then secured and supported in such assembled position in openings in yoke members or carriers 18 with a space between the wall of the opening and the toothed edge of the blades, as clearly shown in Fig. 3. The blades are maintained in parallel relation by bars 19 engaging the outermost blades of the pile, said bars being of a length equivalent to the toothed portion of the blades and of a width to extend from the back edge of the blades to the base of the teeth whereby only the toothed zone and the back edge of the blades with a portion of the perforated ends are exposed. In this condition the blades are inserted in the openings in the yoke members 18 and secured therein by wedges 20. Preferably only two of the carrying yokes are utilized, one adjacent opposite ends of the blades thereby firmly holding the blades in parallel relation and obviating the possibility of the blades becoming distorted during the hardening or tempering operation.

The blades when assembled and clamped in the carrying members 18 as shown in Figs. 2 to 4 are in condition to be subjected to the hardening treatment, and in this condition are placed in a heating furnace, as shown in Fig. 7, to be heated to the desired degree. The carrying yokes are relatively thin thereby facilitating the heating of the blades with the support and reducing the time to heat the same to a minimum. After the assembled blades have been heated to the necessary degree they are removed from the furnace and plunged into a suitable cooling bath, such as water or oil, as shown at 30 in Fig. 8, to suddenly chill the blades. The present bath is shown as consisting of circulating water in a trough 22 having a water inlet 23 and an outlet 24. To prevent undue strain at any part of the blades while in a heated condition in removing the blades from the furnace to the quenching or chilling bath the carrying yokes 18 have perforations 25 which are adapted to be in alinement when in saw carrying position and to be engaged by a hooked carrying bar or rod 26 (Fig. 2) and whereby the blades will be carried from adjacent opposite ends thereby equalizing the carrying strain on the blades and preventing distorting of the same.

It will be obvious that as the entire toothed zone and the back edge of the blades are exposed that only such portions will be subjected to contact with the cooling liquid in the bath 22 with the result that the toothed zone only will be hardened with a scale hardening on the back edge of the blades, and that the body portion of the blades not being subjected to contact with the cooling liquid will remain substantially in its previous state and flexible condition and may be flexed after the hardening of the toothed zone without the liability of breakage thereof.

The sudden submerging and chilling of the heated blades in the bath 22 tends to harden the toothed zone of the blades to an excessive degree and to bring the toothed zone to the desired degree of hardness the temper of the blades is drawn by taking the blades in their assembled condition from the cooling bath 22 and submerging them in a heated liquid, such as oil, in a trough 27 as shown diagrammatically at 31 in Fig. 9, said trough being provided with a thermometer 28 and the liquid maintained at a predetermined temperature by a suitable heater, shown as a gas heater 29.

Having thus described my invention, I claim:

1. The improved method of tempering the teeth of a plurality of saw blades simultaneously, which consists in arranging a plurality of blades in juxtaposed relation with the back edge of one blade alternating with a tooth portion of adjacent blades with the toothed zone of the blades projecting beyond the back edge of adjacent blades to expose the whole surface of the toothed zone of the blades, and then heat treating and cooling the blades while in such assembled position.

2. The improved method of simultaneously tempering the teeth of a plurality of saw blades, which consists in providing the saw blades with recesses at opposite ends of the teeth, assembling the blades in juxtaposed relation with the toothed edge of blades alternating with the back edge of successive blades and the toothed edge of the saws projected beyond the backs by means engaging with and supporting alternate blades by the recessed portion, securing the blades together in such position to expose the back edges and toothed zones of the blades, and then tempering the blades in such secured together position for the purpose specified.

3. The herein described method of hardening the teeth of a plurality of saw blades simultaneously consisting in assembling and supporting a plurality of blades in juxtaposed relation with the tooth portion of the blades free of contiguous blades, heat treating the assembled blades, and then subjecting the blades so supported to a quenching bath and while so supported drawing the temper thereof for the purpose specified.

4. The herein described method of tempering the toothed zone of a plurality of saw blades simultaneously consisting in providing the saw blades with a gage portion at opposite ends of the toothed zone; assembling the blades in juxtaposed relation and arranged so that the back edge of alternate blades will be at the same side with the teeth of alternate blades, and the gage portions of said alternate blades being engaged by the supporting means to project the toothed edge of successive blades beyond the back edge of adjacent blades; clamping the blades together in such position; and then tempering the toothed zone of the blades while in their clamped together condition.

5. The herein described method of assembling and supporting a plurality of saw blades to simultaneously temper the toothed zone of the same, which consists in providing the saw blades at opposite ends of the toothed portion with a recess; assembling said blades side by side with the back and toothed edges of the successive blades alternating and with the recesses and back edge of alternate blades engaged by supporting means to project the toothed edge of successive blades beyond the back edges of adjacent blades; and securing the blades in such position for the purpose specified.

6. The herein described method of assembling a plurality of saw blades to simultaneously temper the toothed zone of the same, which consists in providing the toothed edge of the blades with gage portions to extend substantially below the toothed zone of the blades; assembling the blades in juxtaposed relation with the toothed and back edges of successive blades alternating and the recesses engaged by means to project the toothed edges of alternate blades beyond the back edge of adjacent blades; maintaining the assembled blades in parallel relation by bars engaging at opposite sides of the assembled blades; and securing said assembled blades and bars in clamping and supporting members for the purpose specified.

7. The herein described method of simultaneously hardening the toothed zone and edge portion of a plurality of saw blades, which consists in assembling and supporting a plurality of blades with the toothed zone and back edge of successive blades alternating and the toothed zone of the alternate blades projecting beyond the back edge of alternate blades, clamping the assembled blades in this condition in openings in yoke members with a space between the wall of such opening and the back edge and toothed zone of the blades, and then heat treating and cooling the blades while in such assembled condition.

REINHART W. PITTMAN.